(12) United States Patent
Kuscher et al.

(10) Patent No.: US 8,755,819 B1
(45) Date of Patent: Jun. 17, 2014

(54) DEVICE LOCATION DETERMINATION USING IMAGES

(71) Applicant: Google Inc., Mountain View, CA (US)

(72) Inventors: Alexander Friedrich Kuscher, San Francisco, CA (US); Trond Thomas Wuellner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/668,124

(22) Filed: Nov. 2, 2012

(51) Int. Cl.
*H04W 4/02* (2009.01)
(52) U.S. Cl.
USPC ........................................ 455/456.1; 382/275
(58) Field of Classification Search
CPC ..................................................... H04W 24/02
USPC ................... 455/456.1, 404.2; 382/275, 254; 345/424
See application file for complete search history.

(56) References Cited

U.S. PATENT DOCUMENTS

| | | | |
|---|---|---|---|
| 7,580,952 B2 | 8/2009 | Logan et al. | |
| 2008/0096519 A1* | 4/2008 | Miegel | 455/404.2 |

* cited by examiner

*Primary Examiner* — Phuoc H Doan
(74) *Attorney, Agent, or Firm* — McDermott Will & Emery LLP

(57) ABSTRACT

Aspects of the subject technology relate to systems, methods, and machine-readable media for determining a location of a device. A system is configured to identify a group of devices, wherein each device in the group of devices is within a threshold distance of the other devices in the group of devices, receive at least one image of a surrounding area from one or more devices in the group of devices, and determine a relative position for at least one device in the group of devices based on the at least one image received from the one or more devices.

17 Claims, 6 Drawing Sheets

DEVICE LOCATION DETERMINATION USING IMAGES

BACKGROUND

The present disclosure generally relates to location based services and, in particular, to determining a location of a device.

The location of a device may be used in various applications, such as routing a user from one location to another or publishing a user's current location. Devices can use technologies, such as Global Positioning Systems (GPS), to determine their locations. These technologies, however, may have limited accuracy or may only be used in under certain conditions (e.g., in locations where a GPS signal may be obtained).

SUMMARY

Aspects of the subject technology relate to a computer-implemented method for determining the location of a device. The method includes identifying a group of devices, wherein each device in the group of devices is within a threshold distance of the other devices in the group of devices, receiving at least one image of a surrounding area from one or more devices in the group of devices, and determining a relative position for at least one device in the group of devices based on the at least one image received from the one or more devices.

Additional aspects of the subject technology relate to a system for determining the location of a device. The system includes one or more processors and a machine-readable medium comprising instructions stored therein, which when executed by the one or more processors, cause the one or more processors to perform operations. The operations include transmitting a request for an image of the surrounding area to one or more devices in a group of devices, receiving at least one image of a surrounding area from one or more devices in the group of devices, and determining a relative position for at least one device in the group of devices based on the at least one image received from the one or more devices.

Aspects of the subject technology also relate to a non-transitory machine-readable medium comprising instructions stored therein, which when executed by a machine, cause the machine to perform operations for determining the location of a device The operations include determining whether each device in a group of devices is within a threshold distance of the other devices in the group of devices, receiving an image of a surrounding area from each device in the group of devices, and determining a relative position for at least one device in the group of devices based on the at images received from the group of devices.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Several technologies may be used to determine the location of a device. These technologies may vary in terms of accuracy, reliability, availability, or required equipment. Some of these technologies, however, are not able to determine one device's relative location to another device. For example, it may be difficult to determine when two or more devices are in the same room, or to determine the orientation of two or more devices (e.g., whether the devices next to each other, across from each other, arranged in a circle, or arranged in some other orientation).

Various aspects of the subject technology relate to a system for determining the location of devices based on one or more images from the devices. In some aspects, two or more images from different devices may be compared to determine whether there are any overlapping portions. Based on the two or more images and any overlapping portions of the images, the system can determine the relative positions of the devices. In other aspects, one or more images from a device may be analyzed to determine whether or not another device is visible in the images. If another device is visible, the relative positions of the devices may be determined based on where in the image another device can be seen.

Figure 1:
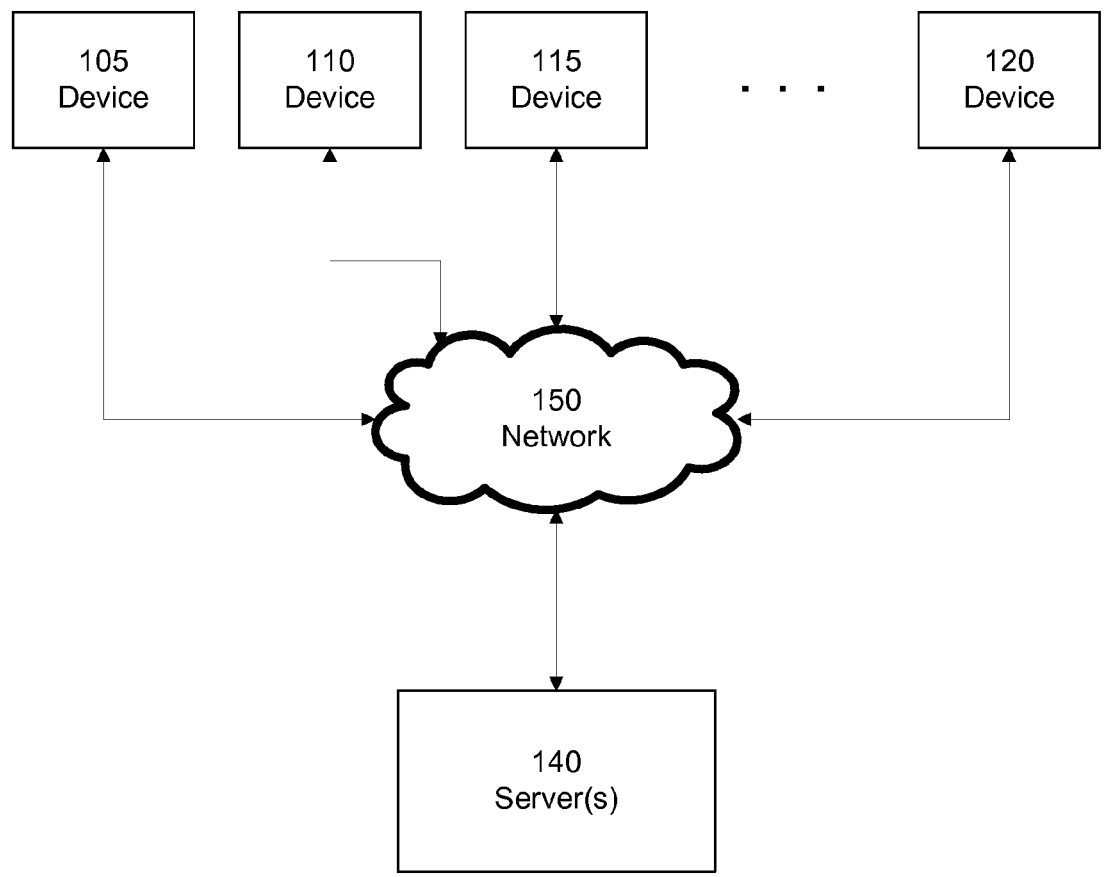
FIG. 1 is a block diagram illustrating an example network environment for determining the location of devices, in accordance with various aspects of the subject technology.

FIG. 1 is a block diagram illustrating an example network environment 100 for determining the location of devices, in accordance with various aspects of the subject technology. Although FIG. 1 illustrates a client-server network environment 100, other aspects of the subject technology may include other configurations including, for example, peer-to-peer environments.

The network environment 100 may include one or more devices 105, 110, 115, and 120 in communication with each other and/or a server 140 via one or more networks 150. The networks 150 may include, for example, a cellular network, a local area network (LAN), a personal area network (PAN), a satellite network, a wide area network (WAN), a broadband network (BBN), the Internet, or a combination of different networks.

Each device can be configured to obtain an image associated with the device and to communicate with the other devices, systems, or servers. The images may be obtained from a camera or other optical device attached to, apart of, or in connection with the device. The devices 105, 110, 115, and 120 may include, for example, mobile devices (e.g., tablet computers, smart phones, or personal digital assistants), laptops, desktop computers, display devices (e.g., televisions or smart-monitors), or any other computing system.

The server 140 may be implemented on one or more computing machines and in some cases, more than one server 140 may be used. The server 140 may be configured to host a number of systems and services. According to some aspects, the server 140 may be configured to host a system for determining the location of one or more devices based on one or more images. In other aspects, however, the system may be implemented on a server one of the devices 105, 110, 115, 120 or on a number of the devices in a peer-to-peer configuration.

Figure 2:
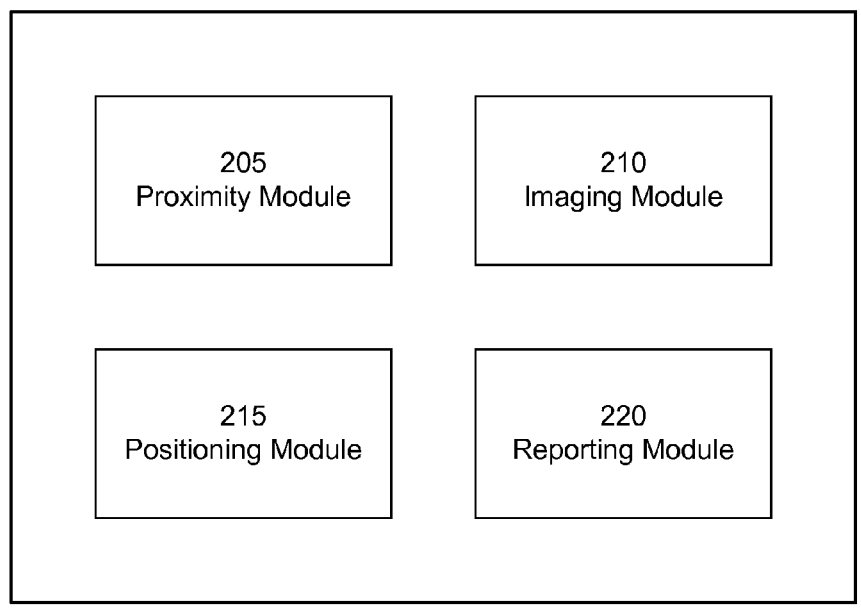
FIG. 2 is a block diagram illustrating an example system configured to determine the location of a device based on one or more images, in accordance with various aspects of the subject technology.

FIG. 2 is a block diagram illustrating an example system 200 configured to determine the location of a device based on one or more images, in accordance with various aspects of the subject technology. The system 200 may include a proximity module 205, an imaging module 210, a positioning module 215, and a reporting module 220. In other aspects, however, the system 200 may include additional modules, fewer modules, or different modules.

The proximity module 205 is configured to determine when a group of devices are near one another. For example, the proximity module 205 may determine the location of devices using global positioning system (GPS) signals, Wi-Fi signals, cellular tower signals, Bluetooth signals, that the devices are within a threshold distance of one another. In other cases, the proximity module 205 may receive an indication from one or more of the devices that the group of devices are near one another.

When a group of nearby devices is identified, the imaging module 210 can transmit, to each device in the group, a request for an image of the surroundings of the device. Upon receiving the request, a device (e.g., device 105 in FIG. 1) may capture an image of the device's surroundings using, for example, a camera that is a part of or in connection with the device and transmit the image to the imaging module 210 of the system 200.

The positioning module 215 is configured to determine the relative location of one or more devices based on the images received from the devices. In some aspects, for example, the positioning module 215 can compare the images and identify an overlapping portion that is found in two or more of the images. Based on the overlapping portion of the images from the devices, the system may determine the relative location of each of the devices (e.g., one device is to the left of another device).

Figure 3:
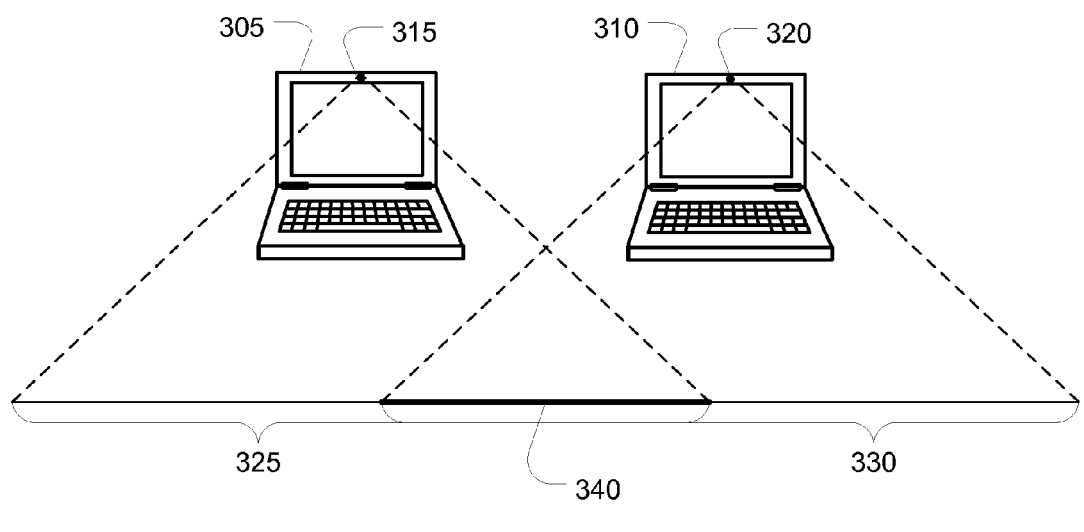
FIG. 3 is a diagram illustrating an example of two devices capturing images with an overlapping portion, according to various aspects of the subject technology.

FIG. 3 is a diagram illustrating an example 300 of two devices capturing images with an overlapping portion, according to various aspects of the subject technology. In FIG. 3, two devices 305 and 310 use cameras 315 and 320 to take two images. The image captured by the camera 315 of device 305 may capture a view 325 of the surrounding areas of device 305 and the image captured by the camera 320 of device 310 may capture a view 330 of the surrounding areas of device 310.

The positioning module 215 may identify an overlapping portion 340 in the images from the cameras 315 and 320 and determine the relative position of device 305 and device 310. For example, the positioning module 215 may determine that device 305 and device 310 are facing the same direction and that device 305 is to the left of device 310 or device 310 is to the right of device 305 from the viewpoint of a user facing device 305 or device 310. In some aspects, the positioning module may also calculate how far a part the devices 305 and 310 are sitting based on the images.

According to some aspects, in addition to transmitting an image, a device may also transmit an indication as to the orientation of the image with respect to the device (e.g., whether the image is from a front-facing camera on the device or from a rear-facing camera). The indication of the orientation of the image with respect to the device may also be used to determine the relative position of one or more devices in the group. Furthermore, if a device has more than one camera (e.g., both a front-facing and a rear-facing camera), the device may capture more than one image using more than one camera and transmit the images and the orientation information for each of the images to the system 200. The positioning module 215 may then use the multiple images and the orientation information for the images to determine the relative location of devices in the group.

According to various aspects, devices may also use visual identifiers that may be used to determine, based on the images, their relative location. For example, each device may be configured to display a colored light on the front or on the back of the device. When the proximity module 205 of system 200 identifies a group of nearby devices, the imaging module 210 can send instructions to the group of devices to each flash a different color light for a certain period of time, to capture an image of the surroundings during that period of time, and to transmit the captured image back to the system 200.

Figure 4:
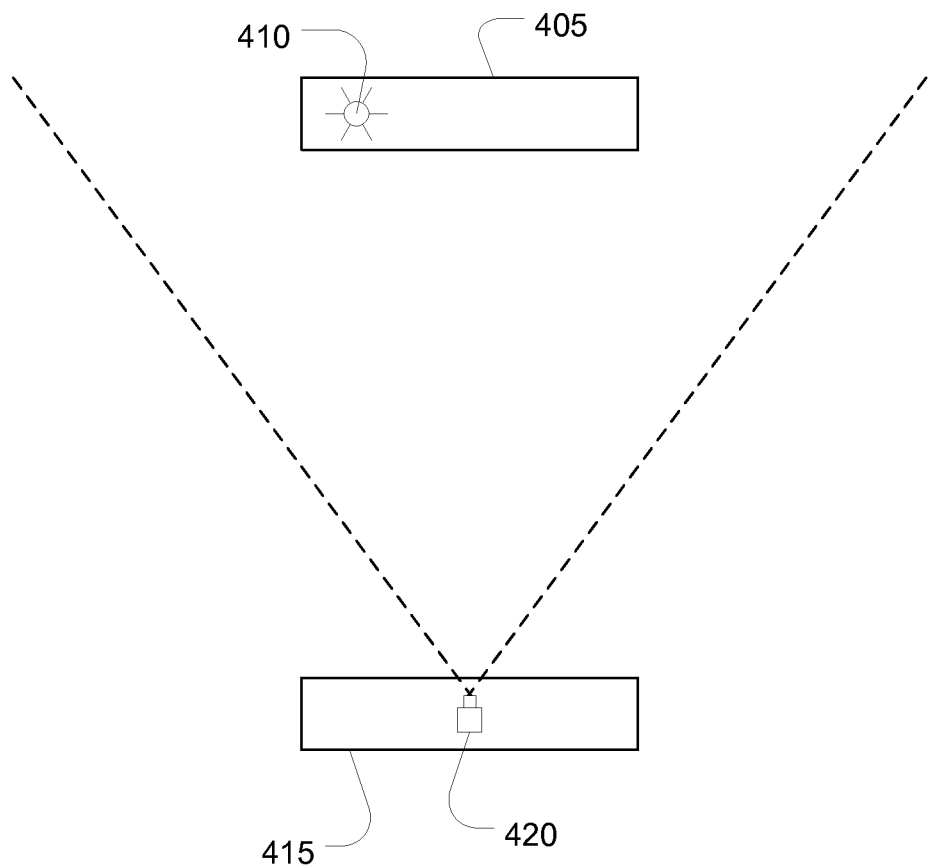
FIG. 4 is a diagram illustrating an example of one device capturing an image of a visual identifier of another device, according to various aspects of the subject technology.

FIG. 4 is a diagram illustrating an example 400 of one device capturing an image of a visual identifier of another device, according to various aspects of the subject technology. In FIG. 4, device 405 may have a visual identifier 410 that may be used to identify the device 405 in an image. The visual identifier may be, for example, a colored light, lights flashing a particular pattern, bar codes, or another visual indication that may identify the device 405. A camera 420 on device 415 may capture an image of the device's surrounding area which may include the visual identifier 410 of device 405.

Using the captured images, the positioning module 215 can identify images that contain one of the colored lights and determine if an image from one device has another device in view. Based on the images, the positioning module 215 can determine the relative location of the devices (e.g., one device is sitting across from another device).

After the positioning module 215 determines the relative position of at least one device in the group of devices, the reporting module 220 may report the relative position to one or more of the devices in the group. The one or more devices in the group may use the position information from the system 200 for a variety of applications, such as in electronic gaming or content sharing applications. For example, a user on one device may share content (e.g., files, video, music, a screen, etc.) with another nearby device by making a gesture toward that device (e.g., using a mouse, a touch screen, or other motion-detecting device to select the content and "flick" the content toward another device). The relative position of the other device may be needed to determine which direction the gesture was towards.

Figure 5:
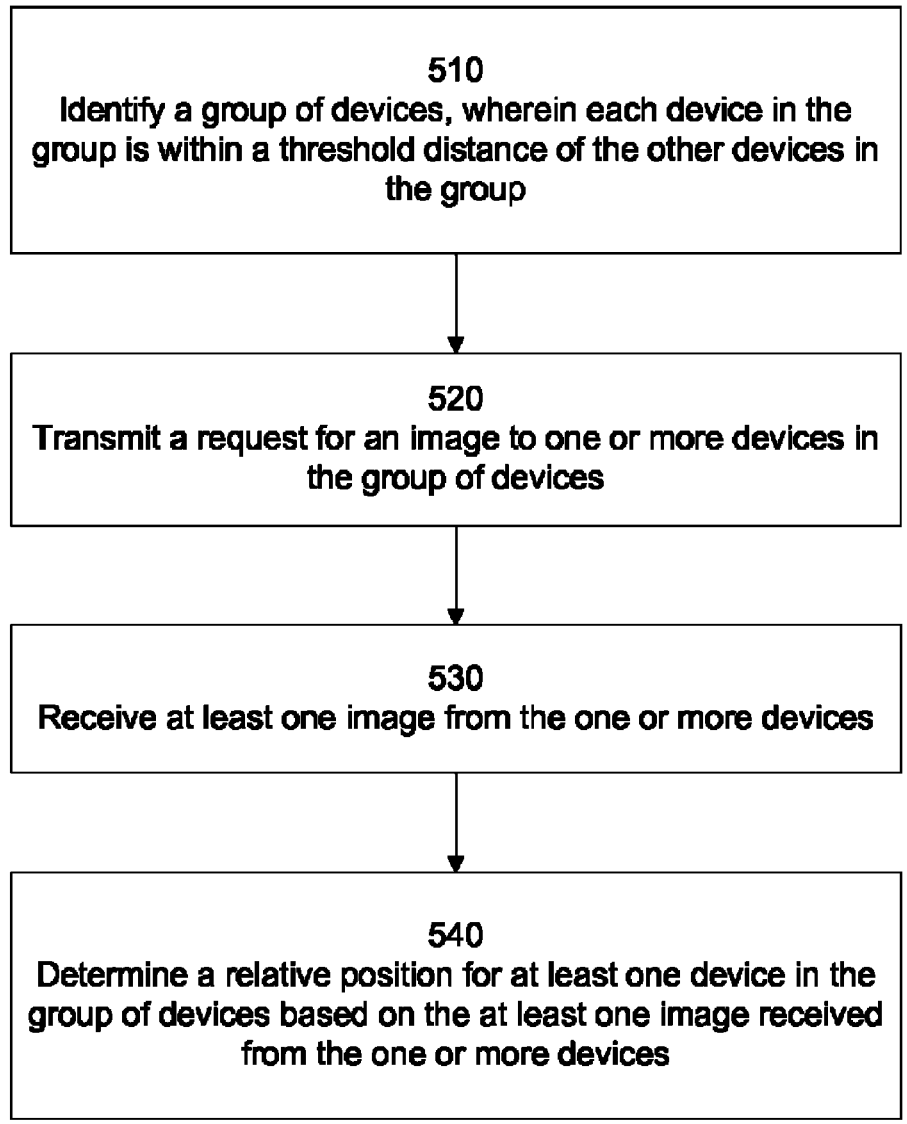
FIG. 5 is a flowchart illustrating an example process for determining a location of a device, in accordance with various aspects of the subject technology.

FIG. 5 is a flowchart illustrating an example process 500 for determining a location of a device, in accordance with various aspects of the subject technology. Although the blocks in FIG. 5 may be discussed with respect to the components of system 200 illustrated in FIG. 2, the blocks are not limited to these modules. Furthermore, although the blocks are shown in one particular order, other orderings of blocks are also possible. For example other orderings may include additional blocks, fewer blocks, or blocks that are executed in parallel.

At block 510, the proximity module 205 may identify a group of devices that are near one another. For example, each device in the group of devices may be within a threshold distance of the other devices in the group. Once a group is identified, the imaging module 210 may transmit a request for an image of a device's surrounding area to one or more devices in the group at block 520. In some aspects, a request may be sent to all devices in the group.

In response to receiving a request for an image of the surrounding area, a device may capture an image and transmit the image (or a compressed version of the image) back to the imaging module 210 on the system 200. At block 530, the imaging module 210 may receive at least one image from the one or more devices. According to some aspects, the imaging module 210 may perform various imaging techniques on the at least one image so that it may be analyzed by the positioning module 215. For example, the images may be resized or simplified, the images may have their contrasts altered, or the images may be normalized to account for any distortion based on image angles.

At block 540, the positioning module 215 may determine a relative position for at least one device in the group of devices based on the at least one received image. According to some aspects, after the relative position is determined, it may be transmitted to one or more of the devices in the group for use. In other aspects, the relative position may also be used by the system 200 for other applications.

Figure 6:
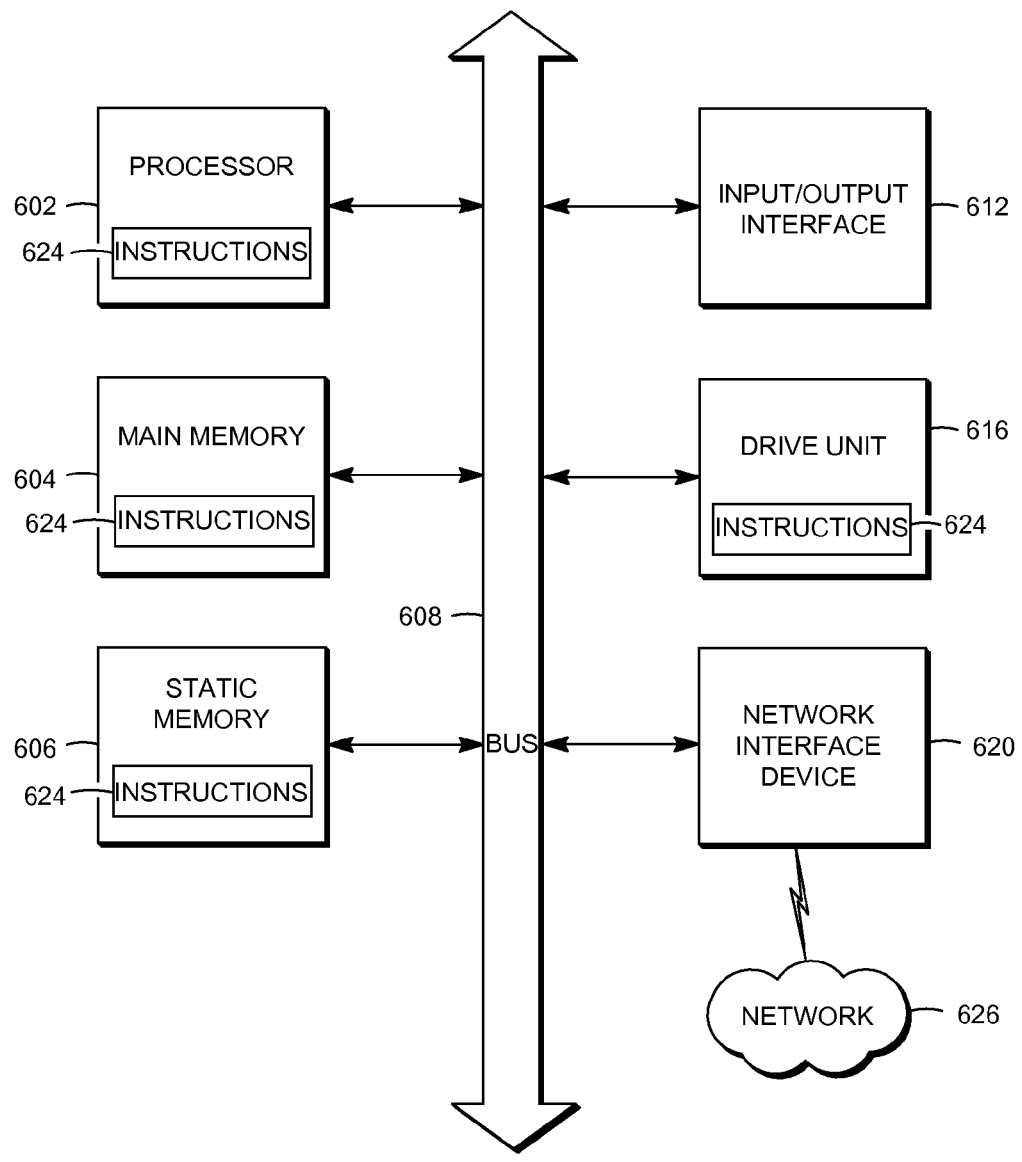
FIG. 6 is a block diagram illustrating an example computer system with which any of the devices, servers, or machines described herein may be implemented.

FIG. 6 is a block diagram illustrating an example computer system 600 with which any of the devices, servers, or machines described herein may be implemented. In certain aspects, the computer system 600 may be implemented using hardware or a combination of software and hardware, either in a dedicated server, or integrated into another entity, or distributed across multiple entities.

The example computer system 600 includes a processor 602, a main memory 604, a static memory 606, a disk drive unit 616, and a network interface device 620 which communicate with each other via a bus 608. The computer system 600 may further include an input/output interface 612 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 602 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 624 embodying any one or more of the methodologies or functions described herein. The instructions 624 may also reside, completely or at least partially, within the main memory 604 and/or within the processor 602 during execution thereof by the computer system 600, with the main memory 604 and the processor 602 also constituting machine-readable media. The instructions 624 may further be transmitted or received over a network 626 via the network interface device 620.

The machine-readable medium may be a single medium or multiple media (e.g., a centralized or distributed database, and/or associated caches and servers) that store the one or more sets of instructions. The machine-readable medium may comprise the drive unit 616, the static memory 606, the main memory 604, the processor 602, an external memory connected to the input/output interface 612, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system.

Skilled artisans may implement the described functionality in varying ways for each particular application. For example, the modules may include software instructions encoded in a medium and executed by a processor, computer hardware components, or a combination of both. The modules may each include one or more processors or memories that are used to perform the functions described below. According to another aspect, the various systems and modules may share one or more processors or memories. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology.

A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

What is claimed is:

1. A method for determining a location of a device, the method comprising:
   identifying a group of devices, wherein each device in the group of devices is within a threshold distance of the other devices in the group of devices;
   receiving at least two images of a surrounding area from two or more devices in the group of devices; and
   determining, using one or more processors, a relative position for at least one device in the group of devices, wherein the determining comprises identifying an overlapping portion in the at least two images and is based on the overlapping portion.

2. The method of claim 1, wherein the identifying of the group of devices comprises:
   receiving a location indication from each device in the group of devices;
   determining that the distances between the location indication from each device and the location indications from the other devices in the group are less than the threshold distance.

3. The method of claim 2, wherein the location indication comprises at least one of a global positioning system (GPS) signal, a Wi-Fi signal, or a cellular tower signal.

4. The method of claim 1, wherein the identifying of the group of devices comprises receiving an indication from at least one device in the group of devices that the group of devices is within the threshold distance of the other devices in the group of devices.

5. The method of claim 1, further comprising transmitting, in response to the identifying of the group of devices, a request for an image of the surrounding area to one or more devices in the group of devices.

6. The method of claim 1, wherein the at least one image received from the one or more devices is associated with an orientation relative to the one or more devices.

7. The method of claim 1, wherein the determining of the relative position comprises:
   identifying a visual identifier associated with a device in the group of devices in the at least one image; and
   wherein the determining of the relative position for the at least one device in the group is based on the visual identifier.

8. The method of claim 7, wherein the visual identifier is a colored light.

9. The method of claim 7, further comprising transmitting, in response to the identifying of the group of devices, a request, to one or more devices in the group of devices, to display the visual identifier.

10. The method of claim 1, further comprising transmitting the relative position for the at least one device in the group to one or more devices in the group.

11. A system for determining a location of a device, the system comprising:
    one or more processors; and
    a machine-readable medium comprising instructions stored therein, which when executed by the one or more processors, cause the one or more processors to perform operations comprising:
       transmitting a request for an image of the surrounding area to one or more devices in a group of devices;
       receiving at least two images of a surrounding area from two or more devices in the group of devices; and
       determining a relative position for at least one device in the group of devices, wherein the determining comprises identifying an overlapping portion in the at least two images and is based on the overlapping portion.

12. The system of claim 11, wherein the operations further comprise:
    identifying the group of devices, wherein each device in the group of devices is within a threshold distance of the other devices in the group of devices, and
    wherein the transmitting of the request is performed in response to the identifying of the group of devices.

13. The system of claim 12, wherein the identifying of the group of devices comprises:
    receiving a location indication from each device in the group of devices;
    determining that the distances between the location indication from each device and the location indications from the other devices in the group are less than the threshold distance.

14. The system of claim 11, wherein the determining of the relative position comprises:
    identifying a visual identifier associated with a device in the group of devices in the at least one image; and
    wherein the determining of the relative position for the at least one device in the group is based on the visual identifier.

15. The system of claim 11, wherein the operations further comprise transmitting the relative position for the at least one device in the group to one or more devices in the group.

16. A non-transitory machine-readable medium comprising instructions stored therein, which when executed by a machine, cause the machine to perform operations comprising:
    determining whether each device in a group of devices is within a threshold distance of the other devices in the group of devices;
    receiving an image of a surrounding area from each device in the group of devices; and
    determining a relative position for at least one device in the group of devices, wherein the determining comprises identifying an overlapping portion in at least two images from the images received from the group of devices and is based on the overlapping portion.

17. The non-transitory machine-readable medium of claim 16, wherein the determining of the relative position comprises:

identifying a visual identifier associated with a device in the group of devices in the at least one image from the images received from the group of devices; and wherein the determining of the relative position for the at least one device in the group is based on the visual identifier.

* * * * *